(12) United States Patent
Zhang

(10) Patent No.: US 10,405,518 B2
(45) Date of Patent: Sep. 10, 2019

(54) AUTOMATIC DOG WASHING MACHINE

(71) Applicant: Weijian Zhang, Irvine, CA (US)

(72) Inventor: Weijian Zhang, Irvine, CA (US)

( * ) Notice: Subject to any disclaimer, the term of this patent is extended or adjusted under 35 U.S.C. 154(b) by 0 days.

(21) Appl. No.: 15/402,238

(22) Filed: Jan. 23, 2017

(65) Prior Publication Data

US 2018/0206449 A1 Jul. 26, 2018

Related U.S. Application Data

(60) Provisional application No. 62/281,806, filed on Jan. 22, 2016.

(51) Int. Cl.
*A01K 13/00* (2006.01)
*A46B 13/04* (2006.01)
*A46B 13/02* (2006.01)

(52) U.S. Cl.
CPC ............ *A01K 13/001* (2013.01); *A46B 13/02* (2013.01); *A46B 13/04* (2013.01); *A46B 2200/1093* (2013.01); *A46B 2200/30* (2013.01)

(58) Field of Classification Search
CPC .. A01K 13/00; A01K 13/001; A61K 2227/10; A46B 13/02; A46B 2200/1093
USPC .................................................. 623/664, 665
See application file for complete search history.

(56) References Cited

U.S. PATENT DOCUMENTS

| 3,427,674 A * | 2/1969 | Simon, Jr. ............... | A46B 13/02 15/23 |
| 3,884,191 A * | 5/1975 | Stout .................... | A01K 13/001 119/671 |
| 4,083,328 A * | 4/1978 | Baker .................. | A01K 13/001 119/673 |
| 4,505,229 A * | 3/1985 | Altissimo ............ | A01K 13/001 119/668 |
| 4,549,502 A * | 10/1985 | Namdari .............. | A01K 13/001 119/664 |
| 5,493,996 A * | 2/1996 | Verschuere .......... | A01K 13/001 119/452 |
| 6,910,446 B2 * | 6/2005 | Johnston, Jr. .......... | A01K 45/00 119/651 |
| 7,389,747 B2 * | 6/2008 | Inahara ................ | A01K 13/001 119/677 |
| 7,717,032 B2 * | 5/2010 | Neto ....................... | A47J 19/02 100/108 |
| 2003/0196608 A1 * | 10/2003 | Lee ....................... | A01K 13/001 119/651 |

(Continued)

FOREIGN PATENT DOCUMENTS

SU 1776374 A1 * 11/1992

*Primary Examiner* — Christopher R Harmon

(57) ABSTRACT

An automatic washing apparatus for dogs and alike animals comprises a washing tub, a brushing plate and a horizontally movable carrier board on each side of the tub. Each brushing plate is attached to a vertically movable crank slider through horizontal extension arms. Each crank slider is motorized by a motor and situated on a carrier board. The carrier boards are mobilized by a low speed motor through pulleys, a timing belt, and wheels on rails. The movement is guided by a guiding rail. The tub includes a door and a drain on the floor and a wastewater compartment beneath the floor. The brushing plates and carrier boards are enclosed under two side covers. The apparatus further provides a water spraying system including spraying tubings, a water tank and a water pump.

7 Claims, 5 Drawing Sheets

(56) References Cited

U.S. PATENT DOCUMENTS

2015/0257355 A1* 9/2015 Pinsky .................... A01J 5/003
119/14.01
2017/0094939 A1* 4/2017 Wright ................. A01K 13/001

* cited by examiner

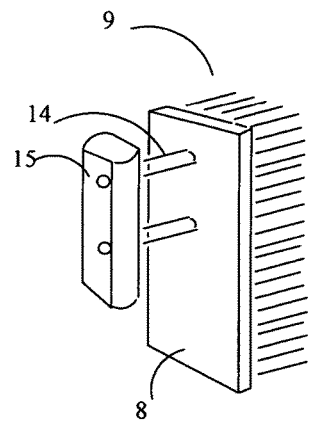 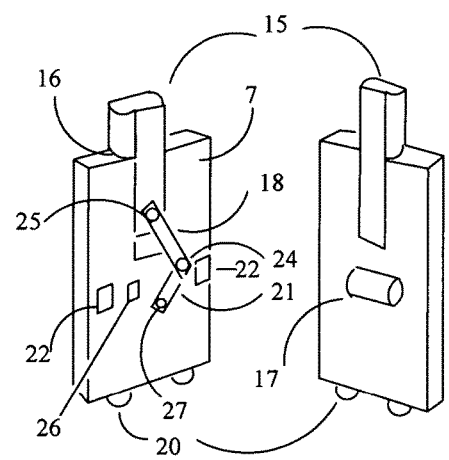 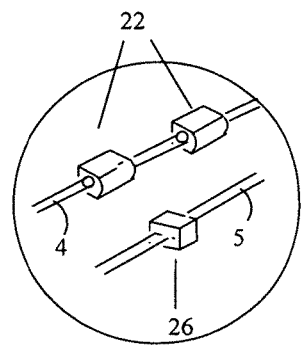
Fig. 5A   Fig. 5B   Fig. 5C   Fig. 5D
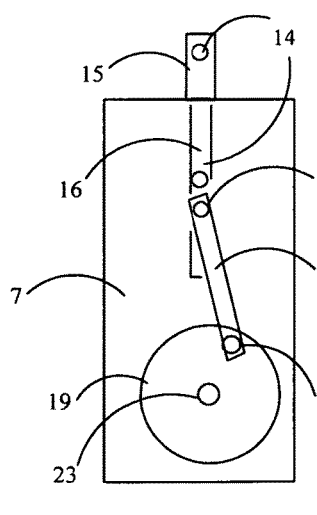 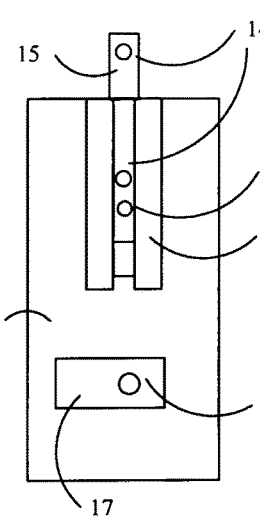 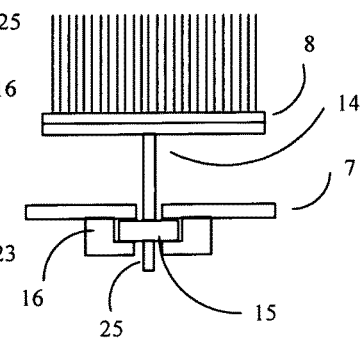
Fig. 6A   Fig. 6B   Fig. 6C

AUTOMATIC DOG WASHING MACHINE

BACKGROUND OF THE INVENTION

1. Field of the Invention

The invention relates to a pet washing machine, and more particularly pertains to an automatic washing machine for dogs.

2. Description of Prior Art

Conventional ways to wash a pet dog at home involve placing a dog in a tub or in a yard and manually rinsing and washing the dog with a brush or by hands of a person. Commercial dog grooming facilities may use expensive pet washing systems consisting of a tub with a filter and a drain, a water heater, a water spray hose, a shampoo dispenser, and a hair dryer. Both situations require manual brushing of human hands, which is tedious and time-consuming.

Commercial automatic dog washers are available in some countries, which are generally expensive and are used as vending machines. However, even fully automatic the dog washing machines only provide water spraying without brushing the furs of a dog. Therefore, the washing is not efficient especially for dogs with long hairs or dense furs.

To improve the efficiency of pet washing many pet washing or grooming devices or apparatuses have been designed in the prior art. However, many of the devices are complicated and impractical. Others are forceful using restraining belts, collars or restrictive containers, which make the dogs nervous and noncompliant such as that in U.S. Pat. No. 4,083,328. Again most pet washing apparatuses use showers as shown in U.S. Pat. No. 3,884,191, or pressured water spray as means of cleaning (U.S. Pat. No. 7,389,747 B2). Pressured water spray is hurtful and ineffective. For example, U.S. Pat. No. 4,505,229 describes an automatic machine comprising a casing in which pressured water is sprayed on an animal through nozzles.

Therefore, an automatic washing machine providing gentle and adjustable brushing on a dog is novel and in need for dog owners and the dog grooming industry.

U.S. Pat. No. 4,549,502 discloses an automatic pet washing apparatus including longitudinally movable rods, which move brushes in same direction. The problem with such design is that the friction between the brushes and a dog's fur caused by the brushing motion makes the dog's position in the closure unstable. This is avoided in this invention wherein the brushing motions are vertical, radial or rotational.

SUMMARY OF THE INVENTION

In accordance with the present invention, an automatic washing apparatus for a pet especially for a pet dog is provided. The apparatus uses simple mechanical mechanisms for brushing and a movable carrier for a brushing plate to brush a dog from head to tail. The apparatus comprises a washing tub with a drain and a wastewater compartment under the drain, a water spraying system including a water tank, spraying tubings, spray nozzles and a water pump. Therefore, it is feasible to manufacture and the cost of such a commercial product will be affordable to dog owners. The apparatus can complete the majority of the washing process automatically without conventional scrubbing by human hands. More parts can be adapted into the apparatus such as parts for water heating, air blowing and vacuuming. As a result, dogs can be maintained in a hygienic condition, beneficial to the health of animals and their owners.

BRIEF DESCRIPTION OF THE DRAWINGS

FIG. 5A is a perspective view of a brushing plate attached to a slider through two arms;

FIG. 5B is a perspective view of the inside of a carrier board showing a crank slider;

FIG. 5C is a perspective view of the outside of a carrier board showing a motor and a slider channel;

FIG. 5D is an enlarged perspective view of a timing belt clamp, a timing belt, and two guide rail bushings on a guide rail, on a carrier board in FIG. 5B;

FIG. 6A is an elevational view of the inside of a carrier board 7, showing a crank disc and a connecting rod;

FIG. 6B is an elevational view of the outside of a carrier board;

FIG. 6C is a top plan view of a brushing plate and its supporting arm, a carrier board, a slider and a slider track;

DESCRIPTION OF PREFERRED EMBODIMENTS

Figure 1:
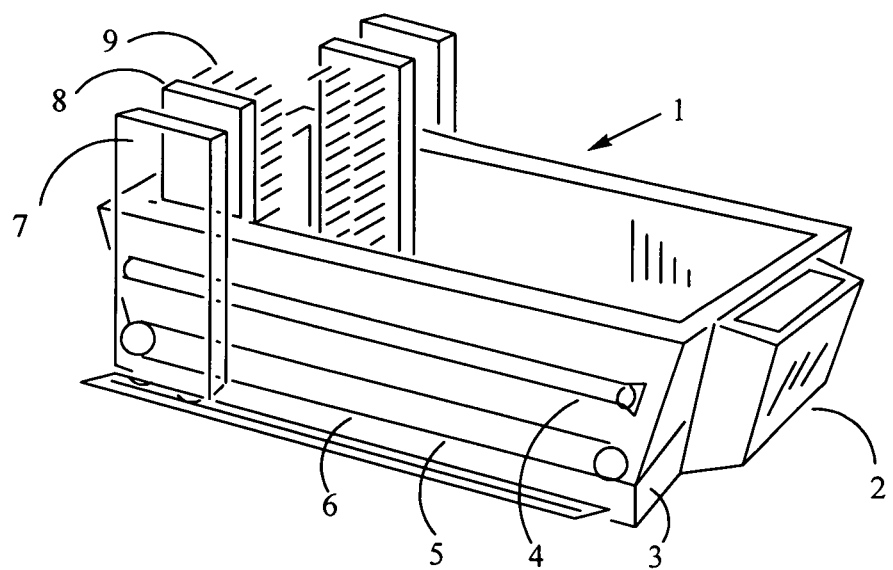
FIG. 1 is a perspective view of a dog washing machine of the present invention without side covers.
Figure 2:
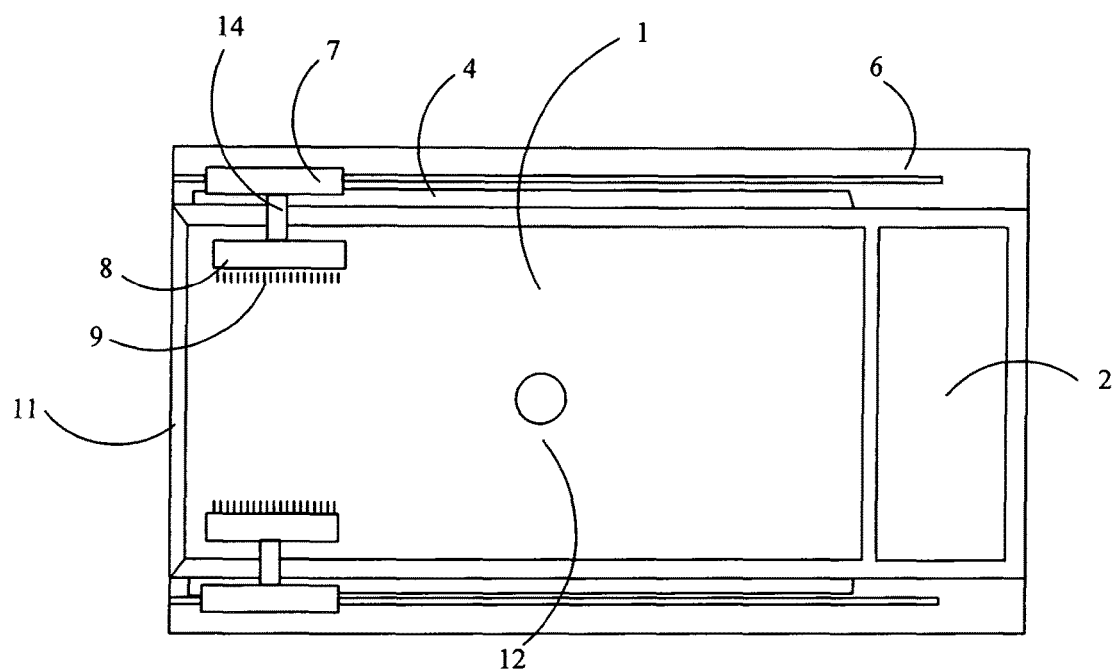
FIG. 2 is a top plan view of the dog washing machine without side covers.
Figure 3:
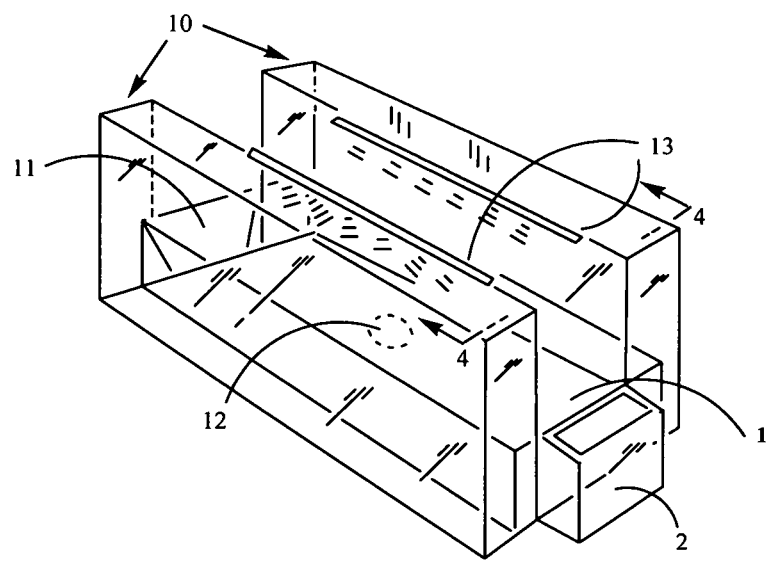
FIG. 3 is a perspective view of the frame structure of the dog washing machine with two side covers.
Figure 4:
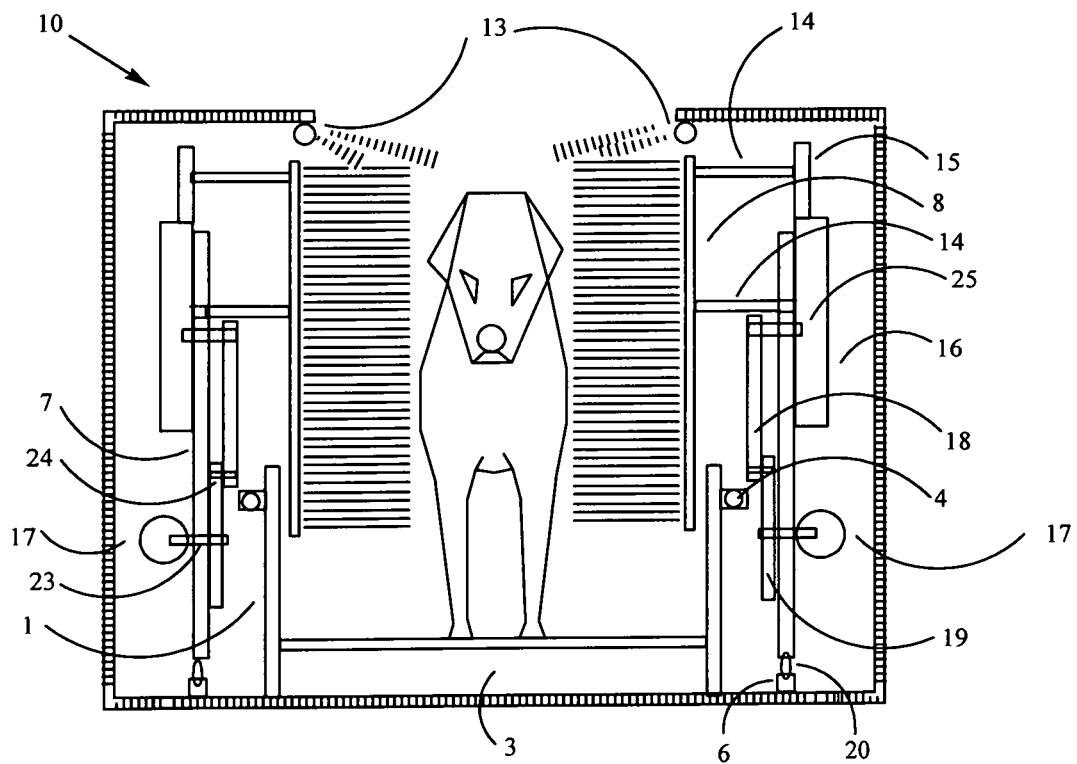
FIG. 4 is a sectional view taken along the line 4-4 of FIG. 3.

With reference to the drawings the invention generally comprises the following components and mechanisms which are contemplated to be employed with all embodiments of the invention disclosed herein: 1) a washing tub (1, in FIG. 1) _ for a pet animal having a drain on the floor leading water to the wastewater compartment (3, FIG. 1) beneath the tub floor, 2) a carrier board (7, FIG. 1) which is a longitudinally movable vertical platform positioned on each outer sides of the tub, 3) a moving system situated on each long side of the outside walls of the tub including a longitudinally mounted guide rail (4, FIG. 1), on which the carrier board can slide reciprocally, and a timing belt (5 in FIG. 1 and FIG. 5D), which drives the carrier board. The carrier board has wheels (20 in FIG. 4, and FIGS. 5B and 5C) on the bottoms and is movable on a rail (6 in FIGS. 1 and 4), 4) a brushing plate (8, FIG. 1) located on each inner side of the tub, movable reciprocatingly or rotationally, with the brushing plate and its bristle (9, FIG. 1) material, shape, size and length being changeable, 5) a mechanical device on each of the carrier boards driven by a motor (17, FIGS. 5C and 6B) transmitting a rotational motion to a brushing motion of the brushing plates, which are attached through adjustable arms (14, FIG. 2) to a moving part of the mechanical device, 6) a water spraying system including two overhead spraying tubings (13 in FIG. 3 and FIG. 4), with spray orifices or nozzles facing down on a dog, a detachable water tank (2 in FIGS. 1-3) for storing warm clean water, and a water pump for delivering water to the spraying tubings, 7) two side covers (10, FIG. 3 and FIG. 4) on each outer sides of the tub, housing the tub, the brushing plates, the carrier boards, the mechanical devices, the moving systems and the spraying system.

The openable door (11, FIG. 2) of the tub is hinged and can be opened downward. The possible leaking through the seam of the door is minimized by a properly tapered tub floor and a drain (12 in FIGS. 2 and 3). To wash a dog an operator pours warm water into the water tank, then leads the dog over the laid down door serving as a ramp. The door is then closed. The distance between the two brushing plates 8 is adjustable by changing the lengths of the arms 14 on the brushing plates 8. The distance the longitudinally moving carrier board 7 travels can be adjusted by setting a return position using a micro switch sensor on the rail 4 based on the length of the animal. The speeds of the movements of the brushing plate and the carrier board can be adjusted by two different speed controls. The material, shape and length of the brushes 9 can be chosen depending on the dog's size, fur type and sensibility. After the animal is stabilized in the washing machine, the switch for the water pump is turned on to spray water. When the fur of the animal is completely soaked the operator turns on the switch for brushing. The dog will be brushed automatically on both sides from head to tail alternately while the carrier boards moving forwards and backwards. The water in the wastewater compartment can be drained to the ground or an elevated drain such as a toilet or a sink using a built-in water pump in the washing machine. After the washing, the animal is dried with a towel and a hair dryer manually. Additional parts can be added to the washing machine to provide a drying function.

The preferred motion modes for the brushing plates are vertical, arc-shaped, or rotational. It is understood that in the following embodiments different brushing motions for the brushing plates can be employed by choosing a mechanical device of a suitable mechanism.

In one embodiment the mechanical device driving the brushing plate is a crank slider, which is attached to a brushing plate through one or more extendable arms 14, in FIG. 5A. The crank can be made of either a crank wheel 19, in FIG. 6A, and a connecting rod 18, in FIG. 6A, or a crank arm 21, in FIG. 5B, and a connecting rod 18, in FIG. 5B. The crank wheel or crank arm is pivotally interconnected with axis 23 in FIG. 6A or axis 27 in FIG. 5B, which can be the shaft of motor 17 in FIG. 5C and FIG. 6B, and pivotally interconnected with a connecting rod 18 at axis 24 in FIG. 5B and FIG. 6A. The connecting rod 18 is pivotally interconnected with slider 15 at axis 25 in FIG. 5B and FIG. 6A. The slider can be a piston in a cylinder or a bar, such as 15 in FIGS. 5A, 5B and 5C and FIGS. 6A, 6B and 6C, with smooth surfaces moving in a channel 16 as depicted in FIG. 5B, or a track 16 as depicted in FIGS. 6A, 6B and 6C.

In another embodiment the mechanical device driving the brushing plate is a pulley and belt system which transmits a motor's rotational force to an arch or rotational motion of the brushing plate.

In the another embodiment the mechanical device driving the brushing plate is a gear system which transmits a motor's rotational force to an arch or rotational motion of the brushing plate.

Figure 7:
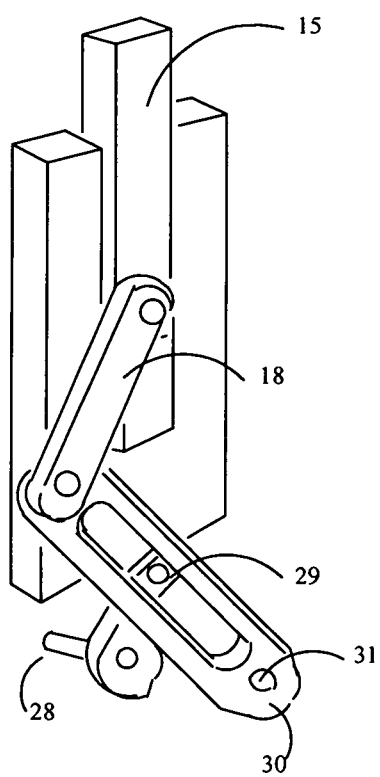
FIG. 7 is a perspective view of an alternative design of the mechanical device using Whitworth quick return mechanism.

In the another embodiment the mechanical device driving the brushing plate is a Whitworth's quick return system which transmits a rotational motion to reciprocating motion of the brushing plate, with a crank arm rotating around axis 28, a crank pin 29 pushing a slotted arm 30 which rotates around axis 31 and pulls and pushes slider 15 through connecting rod 18 as depicted in FIG. 7.

Figure 8:
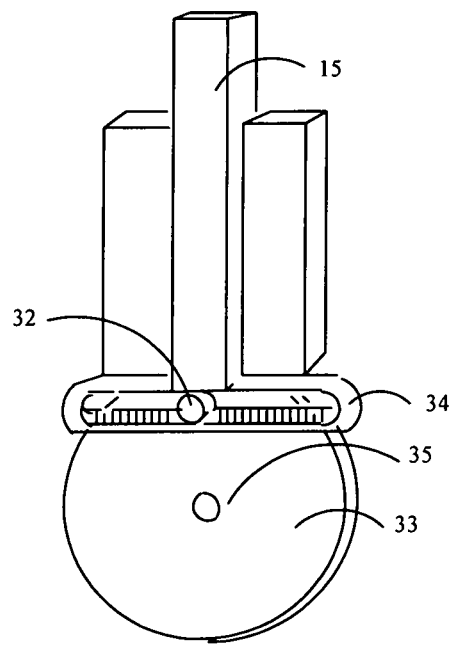
FIG. 8 is a perspective view of an alternative design of the mechanical device using Scotch Yoke mechanism.

In the another embodiment the mechanical device driving the brushing plate is a Scotch Yoke system which transmits a motor's rotational force to reciprocation motion of the brushing plate, with crank pin 32 on crank wheel 33 driving a slotted arm 34, which is attached to the bottom of slider 15. While the crank wheel rotates around axis 35 the slider moves up and down as depicted in FIG. 8.

In the another embodiment the mechanical device driving the brushing plate is a cam/slider system which transmits a motor's rotational force to reciprocation motion of the brushing plate.

In the another embodiment the movable carrier board is driven by a gear system powered by a slowly rotating motor.

Naturally, the scope of the present invention extends to embodiments which achieve equal utility by using the same innovative concept.

I claim:

1. A washing apparatus for animals, such as dogs and the like, comprising:
    a tub having two sidewalls, an openable door at one end, and a floor with a drain;
    a water spray system including a water pump, water tubings and a water tank;
    a brushing means suspended vertically at each inner side of said tub, said brushing means is supported and driven by an extendable arm movable along said sidewall of said tub;
    a mechanical device positioned at each outer side of said tub, said mechanical device having a vertically movable mechanical slider connected to said extendable arm providing a brushing motion to said brushing means, wherein each of said mechanical device is powered by a motor;
    a carrier board positioned at each outer side of said tub, said carrier board is a vertical platform carrying said mechanical device and movable on a track longitudinally and reciprocatingly through pulleys and a timing belt, powered by a low speed motor controllable with micro switch sensors and a motor speed controller.

2. A washing apparatus as defined in claim 1, wherein said carrier board comprises at least one rail bushing movable on a guiding rail.

3. A washing apparatus as defined in claim 1, further including a side cover for each outer side of said tub enclosing said brushing means and said carrier board.

4. A washing apparatus as defined in claim 1, wherein said mechanical device is a crank slider.

5. A washing apparatus as defined in claim 1, wherein said mechanical device is Whitworth's quick return system.

6. A washing apparatus as defined in claim 1, wherein said mechanical device is a Scotch Yoke system.

7. A washing apparatus as defined in claim 1, wherein said mechanical device is a Cam/follower system.

* * * * *